Dec. 12, 1961  R. G. DIQUATTRO  3,012,613
FIRE PREVENTING SYSTEM
Filed June 24, 1959
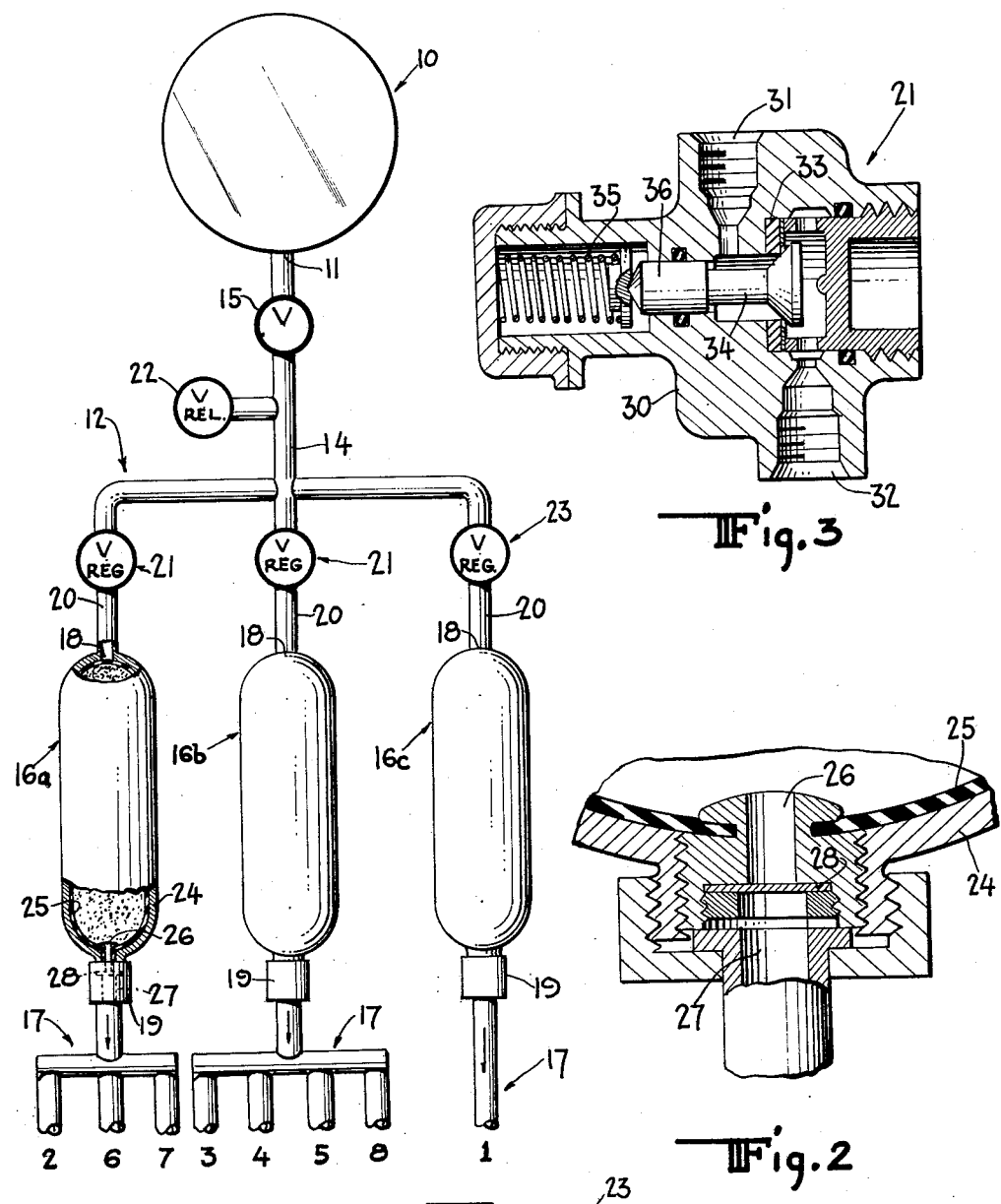
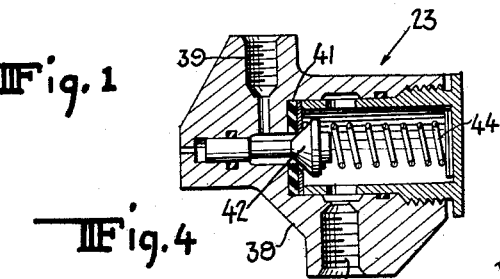
INVENTOR
Robert G. Diquattro
BY
Ernest A. Joerner
ATTORNEY United States Patent Office 3,012,613
Patented Dec. 12, 1961

3,012,613
FIRE PREVENTING SYSTEM
Robert G. Diquattro, Elizabeth, N.J., assignor to Specialties Development Corporation, Belleville, N.J., a corporation of New Jersey
Filed June 24, 1959, Ser. No. 822,584
1 Claim. (Cl. 169—9)

The present invention relates to fire extinguishing, and, more particularly, to an improved system for preventing fire by cooling hot metallic parts which, if contacted by a flammable fluid, would cause a fire.

Heretofore, it has been found that fires can be prevented by applying liquid coolants to hot metallic parts to cool the same to a temperature at which the parts will not ignite a flammable or combustible fluid coming in contact therewith. This is accomplished by pressurizing a receptacle containing the coolant to discharge the same therefrom. Such systems have been proposed for use on aircraft so that, in the event of crash, gasoline or other fuel or oil spilling from broken tanks or supply lines onto hot parts of the engine or auxiliary devices will not be ignited.

In a typical system, the hot parts are sprayed with coolant within 0.15 second after actuation of the system, and all parts are cooled to below the spontaneous ignition temperature of the combustible materials, usually about 500° F., within about 25 seconds. Such cooling not only de-energizes the ignition source, but also, by virtue of the evaporation of the coolant, generates sufficient inert gas to blanket the hot surfaces as they are being cooled and to inert the surrounding atmosphere to prevent the ignition of fuel vapors or mists.

One of the difficulties encountered is that certain parts are hotter than others or are more massive and hence require more coolant to be supplied in order to make the craft safe within a desired period of time. In modern aircraft of the jet-type, the cooling requirements vary widely, for example, on one type of such craft, there are eight areas or parts which require different discharge rates and quantities of coolant to make the same safe within the prescribed time.

Accordingly, an object of the present invention is to provide a fire preventing system for cooling a plurality of hot metallic structures each constituting a fire hazard having a specific characteristic and requiring a specific treatment to cool the same to a desired safe temperature.

Another object is to provide such a system wherein the flow rate and quantity of coolant supplied is controlled so that all of the parts are properly cooled to the safe temperature.

Another object is to provide such a system which reduces to a minimum the weight penalty imposed by carrying the coolant.

A further object is to provide such a system which is extremely simple, practical and reliable and is economical to fabricate and install.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a schematic view of a fire preventing system in accordance with the present invention.

FIG. 2 is an enlarged fragmentary longitudinal sectional view of the receptacle for the coolant and its valve.

FIG. 3 is a longitudinal sectional view of a flow regulator.

FIG. 4 is a longitudinal sectional view of another type of flow regulator.

Referring to the drawing in detail, there is shown a system for aircraft which generally comprises a receptacle 10 for containing medium under pressure having an outlet 11, a manifold 12, a conduit 14 connecting the outlet 11 to the manifold 12, a valve 15 in the conduit 14, a plurality of receptacles 16a, 16b and 16c for a liquid coolant each having outlet means 17 for conducting coolant to one or more supply points and each having an inlet 18, a valve 19 for controlling each of the outlet means 17, conduit means 20 individually connecting the inlets 18 to the manifold 12, a flow rate regulator 21 in the conduit means 20 connected to the receptacles 16a and 16b, and a flow regulator 23 in the conduit means 20 connected to the receptacle 16c.

The receptacle 10 is adapted to contain a compressed gas at a given pressure, for example, nitrogen at a pressure of 3000 p.s.i., which is confined in the receptacle by the valve 15. A relief valve 22 is connected in the conduit 14 to prevent the pressure of the gas passing through the valve 15 from exceeding the desired given pressure for the reason to be explained hereinafter.

The valve 15 normally is closed and is of the type which can be fully opened practically instantly by a solenoid or an explosive actuator under the control of a switch which responds to or is operated in anticipation of collision or crash of the aircraft. Such valves, switches and electrical control circuits are well known and need not be illustrated or described in detail herein.

By way of example, three receptacles 16a, 16b and 16c are illustrated which, in order to expel coolant therefrom without loss of the pressurizing medium, preferably comprise an outer shell 24 formed with the inlet 18, and a collapsible bladder 25 containing the coolant and having an outlet 26 extending through a sealed opening 27 in the shell 24 to the valve 19 (FIG. 2).

As also shown in FIG. 2, the valves 19 preferably are of the burstable disc type which include a disc 28 normally providing a seal for the outlet 26 of the bladder 25 and being adapted to burst instantly upon subjecting the coolant to a pressure of a given value whereby the coolant flows through the outlet means 17.

As shown in FIG. 3, the flow regulators 21 are of the differential pressure type; and generally comprise a body 30 having an inlet 31, an outlet 32 and a valve seat 33 between the inlet and the outlet, a valve member 34 adapted to engage the seat at its downstream side having a slidably mounted stem 36, and a spring 35 for biasing the valve stem to hold the valve member off its seat.

The upstream load acting on the valve is the sum of the spring force and the force of the upstream pressure acting on the cross-sectional area of the valve member at port of the seat less the force of the upstream pressure acting on the cross-sectional area of the valve stem which area is smaller than the area of the valve member at the seat; and the downstream load acting on the valve is the force of the downstream pressure acting on the cross-sectional area of the valve member at the port of the seat, whereby the valve member is held off its seat until the magnitude of the downstream pressure becomes of a value to cause the downstream load to exceed the upstream load and thereby close the valve.

As shown in FIG. 4, the flow regulator 23 is of the back pressure type; and generally comprises a body 38, having an inlet 39, and outlet 40 and a valve seat 41 between the inlet and the outlet, a valve member 42 adapted to engage the seat at its downstream side, and a relatively strong spring 44 for biasing the valve member on its seat. The valve is held open when the upstream pressure load exceeds the combined downstream pressure load and the spring force, but is closed when the upstream pressure decays to a known value at which the combined downstream pressure load and the spring force exceeds the upstream pressure load.

Since the eight hot parts or structures to be cooled vary in mass and temperature, the amount of coolant and its supply rate vary for each part. In order to eliminate the necessity of providing as many as eight individual systems for simultaneously supplying coolant sprays of different rates and durations at each supply point, the present invention contemplates selecting the parts which have somewhat similar requirements and treating the same as a group, whereby the number of individual receptacles 16 and flow regulators 21 therefor are reduced to a minimum. In a practical system, the supply points of similar coolant flow rates and duration are grouped together, and the flow rate and duration requirement of the point in each group which is the greatest is used for the group.

As shown in FIG. 1, supply point 1 requires a spray of coolant at a high rate and of a short duration, whereby a large quantity of coolant is required and the entire contents of the receptacle 16c must be supplied to that point. Hence, this point is treated individually rather than placed in a group, and a flow regulator 23 is used which shuts off in response to a relatively small pressure drop at its inlet. Supply points 2, 6 and 7 require a lesser rate and a longer duration and supply points 3, 4, 5 and 8 require an even lesser rate and an even longer duration, and thus can be grouped; and the receptacles 16a and 16b can be provided with a flow regulator 21.

In the system shown, the receptacles 16a, 16b and 16c contain sufficient coolant for the respective supply points. While they are illustrated as being the same in size, it is contemplated that they may vary in size and capacity to meet various combinations of requirements. The flow regulators 21 and 23 are constructed and arranged to enable the gas to exert a desired pressure on the bladders 25 so that flow from the receptacles is at the desired rate and for the desired duration. Sufficient nitrogen is stored in the receptacle 10 at a given initial pressure to provide sufficient pressure on the bladders to complete discharge of the coolant within the desired duration.

The pressure in the receptacle 10 initially is of a known value, at a known temperature for example 3000 p.s.i., at 70° F. and as discharge of the nitrogen takes place this pressure decays at a known rate and to a known value within a given duration. By reason of their construction, the flow regulators 21 and 23 supply nitrogen pressures to the receptacles 16a, 16b and 16c which pressures decay at known rates and to know values within given durations. Thus the flow regulators 21 and 23 are so adjusted that, at the instant the coolant has been completely expelled from the receptacles 16 respectively connected to the regulators, the downstream load on the valve member 34 exceeds the upstream load to thereby cause the valve to close.

In operation, the valve 15 is opened and compressed nitrogen passes through the flow regulators 21 and into the receptacles 16. As each receptacle 16 is exhausted of coolant, its respective flow regulator prevents further flow of nitrogen into the receptacle when its bladder has been completely collapsed, whereby the regulator prevents nitrogen from being wasted. This avoids unnecessary buildup of pressure and gas content in one receptacle which would result in ineffective expulsion of coolant from the receptacle having the longest discharge time. In this manner, the planned discharge of coolant can be effected with a predetermined minimum supply of gas, whereby the weight of the system is reduced to a minimum.

In order to accomplish the foregoing, the pressure of the nitrogen at the instant the valve 15 is opened must always be the same, that is, 3000 p.s.i. in the illustrative embodiment. In the event the nitrogen in the receptacle 10 is heated during flight and its pressure is increased, the relief valve 22 upon opening of the valve 15 reduces the pressure of the nitrogen passing through the conduit 14 back to 3000 p.s.i.

As an example of a practical system, the receptacle 10 has a capacity of 240 cu. ins., and the receptacles 16a, 16b and 16c have a liquid capacity of 1165, 1390, and 347 cu. ins. respectively.

The flow regulator 23 for the receptacle 16c provides a regulated downstream pressure of 500 p.s.i.g. the instant the valve 15 is opened which pressure decays to 150 p.s.i.g. in 1.75 seconds, and the regulator shuts off when the upstream pressure from the receptacle 10 drops to 2000 p.s.i.g. at which time the receptacle 16c has been emptied.

The flow regulator 21 for the receptacle 16a provides a regulated downstream pressure of 500 p.s.i.g. the instant the valve 15 is opened which pressure decays to 150 p.s.i.g. in 10 seconds, and the regulator shuts off when the upstream pressure from the receptacle 10 drops to 500 p.s.i.g. at which time the receptacle 16a has been emptied.

The flow regulator 21 for the receptacle 16b provides a regulated downstream pressure of 500 p.s.i.g. the instant the valve 15 is opened which pressure decays to 145 p.s.i.g. in 22 seconds at which time the receptacle 16b is emptied. Also, at this time the upstream pressure has decayed to about 145 p.s.i.g. and is in equilibrium with the pressure in the receptacle 16b whereupon the regulator shuts off.

Thus within 22 seconds, all the hazards have been cooled to a safe temperature in the desired manner with a minimum of pressure medium being used to completely empty the coolant storage receptacles.

From the foregoing description, it will be seen that the present invention provides a simple, practical and economical system for cooling a plurality of hot metallic structures each requiring a specific amount of coolant to be supplied within a given period of time.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

A fire preventing system for cooling a plurality of hot metallic structures each constituting a fire hazard having a specific characteristic and requiring a specific treatment to cool the same to a desired safe temperature within a given period of time, which system comprises a receptacle for containing medium under a desired pressure having an outlet, a manifold, a conduit connecting said outlet to said manifold, a normally closed valve in said conduit, a relief valve connected in said conduit between said valve and said manifold for reducing the pressure of the medium to its desired pressure upon opening of said valve in the event the pressure is greater than the desired pressure, a plurality of receptacles for a liquid coolant adapted to be expelled therefrom by pressure each having closure outlet means for conducting coolant to a hazard and each having an inlet, certain of said outlet means including a different number of coolant distributing branches than others, conduit means individually connecting said inlets to said manifold, said coolant containing receptacles including an outer shell having said inlet and a bladder in said shell for containing the coolant having an outlet in fluid flow connection with said outlet means, and a flow regulator in each of said conduit means for determining the pressure of the medium supplied to the coolant containing receptacles to thereby determine the rate and duration coolant is expelled therefrom.

References Cited in the file of this patent

UNITED STATES PATENTS

| | | |
|---|---|---|
| 2,577,744 | Faust | Dec. 11, 1951 |
| 2,737,249 | Pinkel et al. | Mar. 6, 1956 |
| 2,767,796 | Roberts | Oct. 23, 1956 |